United States Patent [19]

Anderson

[11] 4,156,582
[45] May 29, 1979

[54] LIQUID COOLED GAS TURBINE BUCKETS

[75] Inventor: Rodger O. Anderson, Schenectady, N.Y.

[73] Assignee: General Electric Company, Schenectady, N.Y.

[21] Appl. No.: 749,719

[22] Filed: Dec. 13, 1976

[51] Int. Cl.² .............................................. F01D 5/18
[52] U.S. Cl. ..................................... 416/96 R; 416/92
[58] Field of Search ....................... 416/92, 96, 97, 95, 416/96 A; 415/115; 165/168

[56] References Cited

U.S. PATENT DOCUMENTS

| | | | |
|---|---|---|---|
| 1,942,995 | 1/1934 | Biggs | 415/115 |
| 2,641,440 | 6/1953 | Williams | 416/96 X |
| 2,811,761 | 11/1957 | Bauer | 165/168 |
| 2,994,124 | 8/1961 | Denny et al. | 416/96 |
| 3,251,198 | 5/1966 | Cornelius | 165/171 |
| 3,271,004 | 9/1966 | Smuland | 416/91 |
| 3,619,076 | 11/1971 | Kydd | 416/92 |
| 3,849,025 | 11/1974 | Grondahl | 416/96 |
| 3,856,433 | 12/1974 | Grondahl et al. | 416/97 |

FOREIGN PATENT DOCUMENTS 816686  8/1951  Fed. Rep. of Germany ........... 165/168

OTHER PUBLICATIONS

Flight, Mar. 16, 1956, pp. 293–294 (vol. 69, No. 2460).

Primary Examiner—Everette A. Powell, Jr.
Attorney, Agent, or Firm—Jerome C. Squillaro

[57] ABSTRACT

Turbine buckets are designed for use in an environment of ultra-high temperatures by incorporating therein water cooling channels using preformed tubes which are located beneath an outer protective layer. This layer is preferably composed of an inner skin which provides high thermal conductivity and an outer skin which provides protection from hot corrosion.

3 Claims, 7 Drawing Figures

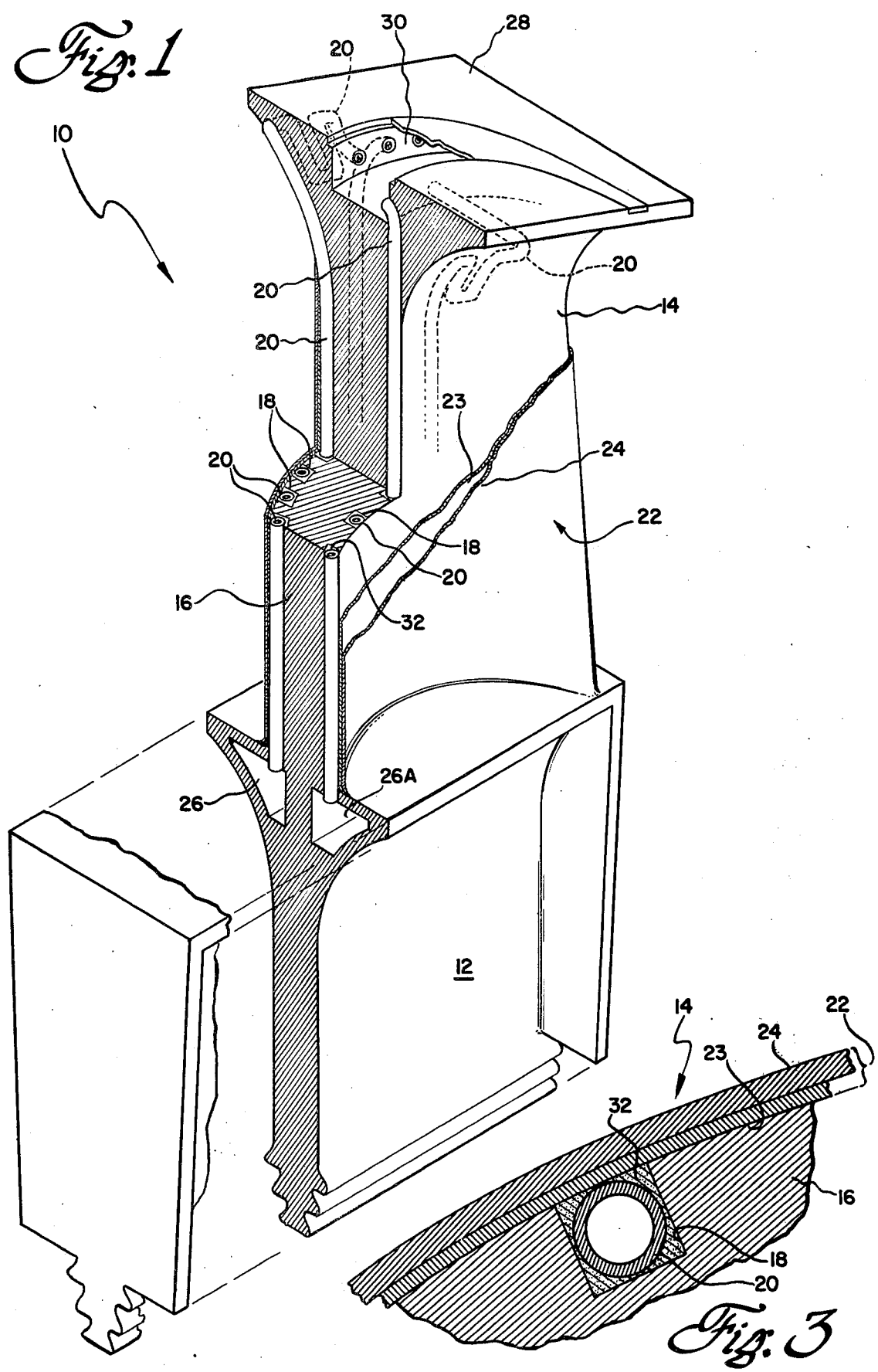

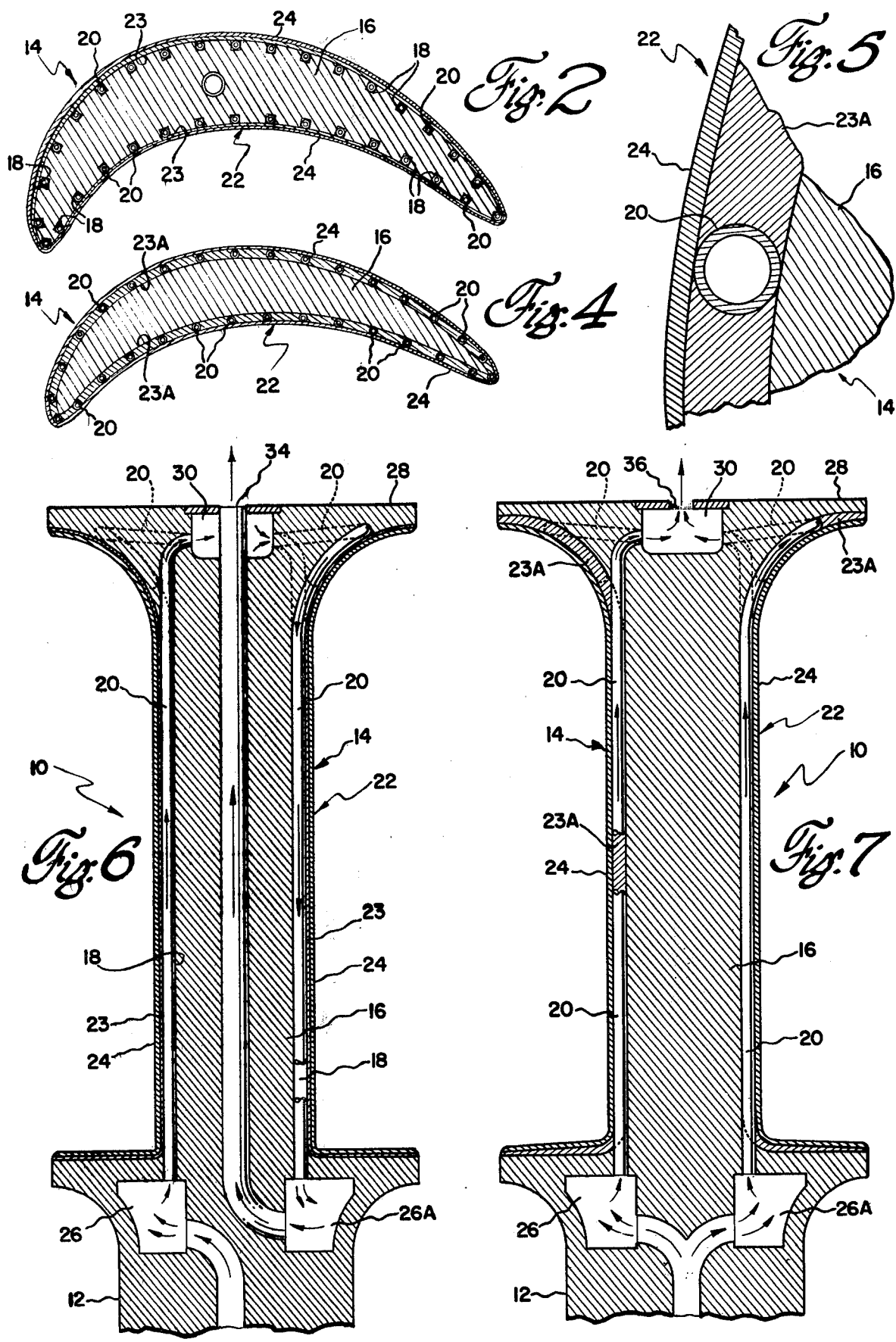

LIQUID COOLED GAS TURBINE BUCKETS

BACKGROUND OF THE INVENTION

A general description of the thermodynamic and aerodynamic theory underlying the design of the gas turbine engine is presented by H. Cohen, et. al., Gas Turbine Theory, Second Edition, John Wiley & Sons, 1973. On page 232, the reference discusses "cooled turbines" which involves the application of substantial quantity of coolant to the nozzle and rotor blades. This permits an increase in the turbine inlet temperature and thereby increasing the specific power output. The reference mentions that apart from the use of spray cooling for thrust boosting in turbojet engines, the liquid systems have not proved to be practical. A discussion of some of the materials and processes used in the General Electric heavy duty gas turbines is presented in a paper by F. D. Lordi, Gas Turbine Materials and Coatings, GER-2182J, General Electric Co., 1976. This paper gives a detailed description of the processing techniques for casting turbine buckets and nozzles, the alloys from which they are made, and the application of corrosion resistant coatings.

Structural arrangements for the open-circuit liquid cooling of gas turbine buckets are shown by Kydd, U.S. Pat. No. 3,445,481 and 3,446,482. The first patent discloses a bucket having cooling passages open at both ends which are defined by a series of ribs forming part of the core portion of the bucket and a sheet metal skin covering the core and welded to the ribs. The second patent discloses squirting liquid under pressure into hollow forged or cast turbine buckets. Another patent issued to Kydd, U.S. Pat. No. 3,619,076 describes an open circuit cooling system wherein a turbine blade construction consists of a central airfoil-shaped spar which is clad with a sheet of metal having a very high thermal conductivity, e.g. copper. The cladding sheet has grooves recessed in the sheet face adjacent to the spar, which grooves together with the smooth surface of the spar define coolant passages distributed over the surface of the turbine blade. There are numerous disadvantages in forming liquid cooling passages by bonding a sheet to a core in either of the configurations shown in U.S. Pat. Nos. 3,445,481 or 3,619,076. Thus, when a braze is used to bond the skin, some channels of the turbine buckets become plugged and obstructed with braze material. Excellant bonds are required between the core and the skin to contain the water in full channel flow under the extremely high hydraulic pressures which result from the centrifugal forces during operation of the turbine. In addition, any cracks in the skin can cause leakage of the coolant and result in vane failure.

SUMMARY OF THE INVENTION

In accordance with my invention, I have discovered a liquid cooled gas turbine bucket having a pressurized water cooling system flowing in tubes located beneath a protective skin. The bucket is comprised of a body having radial grooves located therein near the surface of the body, thermally conductive tubing is fitted and bonded into the grooves through which the cooling liquid flows, and a protective skin is bonded to the outer surface of the body to provide corrosion resistance against the hot corrosive environment of the gas turbine. The skin is preferrably a composite of an inner skin which provides high thermal conductivity and an outer skin which provides protection from hot corrosion. Pressurization of the system to about 1500 psi allows the cooling water to go through a large temperature rise without encountering vigorous boiling.

BRIEF DESCRIPTION OF DRAWING

The invention is more clearly understood from the following description taken in conjunction with the accompanying drawing in which:

FIG. 1 is a perspective view, with portions broken away, of a turbine bucket having the novel features of the present invention.

FIG. 2 is a transverse sectional view of the airfoil portion of a turbine bucket as shown in FIG. 1 illustrating an embodiment of the invention.

FIG. 3 is an enlarged fragmental view of the airfoil of FIG. 2 showing the location of the cooling tubes.

FIG. 4 is a transverse sectional view of the airfoil portion of a turbine bucket illustrating another embodiment of the invention.

FIG. 5 is an enlarged fragmental view of the airfoil of FIG. 4 showing the location of the cooling tubes.

FIG. 6 is a longitudinal sectional view illustrating the path of the cooling fluid in full channel flow.

FIG. 7 is a longitudinal sectional view illustrating the path of the cooling fluid in partial channel flow.

DESCRIPTION OF PREFERRED EMBODIMENT

Referring to FIG. 1, turbine bucket 10 consists of a shank 12 and a water cooled airfoil 14 constructed from a core 16, having a multiplicity of radial grooves 18 either cast or machined into the surface thereof. The number of these grooves 18 depends on the size and the cooling requirements of the bucket 10. Into these grooves 18 are fitted preformed cooling tubes 20 which are bonded to the core 16 such as by brazing and preferrably have a portion exposed to and in contact with a composite skin 22 which covers and envelopes the outer surface of the core 16. This composite skin 22 is composed of an inner layer or skin 23 which is highly heat conducting to maintain substantially uniform temperature over the surface of the bucket during operation of the turbine, resulting from exposure with the hot gases on the outside of the bucket and the internal water cooling. The preferred inner skin material is copper or a copper containing material which, however, is not resistant to the corrosive atmosphere of the hot gases present during operation of the gas turbine. Therefore, an outer corrosion resistant skin 24 is required to cover and protect the inner skin 23.

The cooling tubes 20 are shown to connect the root plenum 26 and 26a to the tip shroud plenum 30. Some of the cooling tubes 20 continue on to the underside of the tip shroud 28 and serpentine back and forth before emptying into the tip shroud plenum 30. This cools the shroud and aids in the manufacturing process since the shroud cooling channel is a continuation of the airfoil cooling tubes 20. No critical joining is necessary. The core 16 is cast along with the tip shroud 28 and the shank 12 and carries the centrifugal load of the tubes 20, the composite skin 22 and the tip shroud 28.

FIG. 2 shows a cross-sectional of the airfoil section 14 of the turbine bucket 10 and FIG. 3 is an enlargement of the structure in the proximity of one of the tubes 20. As is shown, the cooling tubes 20 are fitted into and bonded to grooves 18 within the core 16 of the airfoil by means of braze 32. The composite skin 22, consisting of an inner skin 23 and an outer skin 24, overlays the tubes 20 and the core 16.

FIG. 4 is a modification of the design of FIG. 2. An enlargement of the structure in the proximity of one of the tubes 20 is shown in FIG. 5. In this embodiment of the invention, the core 16 is cast having a smooth surface without grooves. The cooling tubes 20 are now embedded, such as by powder metallurgy techniques, in a thermally conductive copper layer 23A which acts as a heat exchanger. Again a protective skin 24 covers and provides corrosion protection for the sublayer 23A.

FIG. 6 illustrates a cooling design in which the water is in full channel flow, i.e., the cooling tubes 20 are completely filled with water under pressure, and the arrows indicate the direction of cooling water flow. The water initially travels outwardly from a channel within the shank 12 into the root plenum 26 which is connected to the tubes 20 on the convex side of the airfoil 14. The water then travels through the tubes 20 first cooling the convex side of the airfoil 14 and then serpentines back and forth before discharging into the tip shroud plenum. The water then continues by another serpentine path into the concave side of the airfoil 14 through cooling tubes 20 and empties into the root plenum 26A. Subsequently, the water is discharged through exiting tube 34.

Another embodiment is shown in FIG. 7, wherein the cooling design is such that the water is in partial channel flow i.e., the cooling tubes 20 are only partially filled with water in the liquid form. In this design the water flows outwardly from a channel in the shank 12 into both root plenums 26 and 26A which supply the tubes 20 on the convex and concave sides of the airfoil 14 respectfully. The water then travels outwardly through the tubes 20 into the tip shroud plenum 30 by means of a serpentine path in the tip shroud 28 and out of an exiting port 36.

The formation of mineral deposits or any other material on the inside of the cooling tubes should be avoided. Thus, it is important to use substantially pure water, such as demineralized water.

The outer skin material should exhibit a relatively high thermal conductivity so that the surface temperatures and the thermal gradients can be reduced. The thermal expansion of the outer skin must be equivalent to or preferably less than the subskin in order to reduce the thermal strains. Optimization of these physical properties, maximizes low cycle fatigue and creep-rupture life.

Because of the direct exposure of the skin to the hot-gas stream, material selection becomes more complex. The primary operating requirements for the outer skin are resistance to low cycle fatigue damage, corrosion, hot-gas erosion, foreign object damage, and metallurgical instability. Creep and high cycle fatigue may also be important. Each of these are necessary to achieve long operationg life. Metallurgical instability may result in severe mechanical property degradation.

Fabrication requirements of the outer skin include formability, weldability, brazeability, and material compatability within all the processing steps. Formability is required to successfully wrap the material in sheet form having a thickness of about 5–20 mils around the bucket airfoils and about a 20 percent ductility is considered to be adequate. Weldability and brazeability are required to join the skin sections to themselves and the inner skin. Because of the involved processing, (forming, heat treatments, joining cycles, etc.), the properties must be stable, or at least controllable and predictable, as a result of these operations.

Useful outer skin alloys are described in Table 1. IN617 is shown to have the most desirable properties. The next best alloys are IN671 (Ni-50Cr), Hastelloy-S, Incoloy 825, and Carpenter 20Cb-3 stainless steel. Other materials considered are Nickel 201, the high chromium ferrities (Type 430, Type 446, and FeCrAlY as defined by U.S. Pat. No. 3,528,861), Incoloys 800 and 801, Hastelloy-X, and HS188. Low temperature hot corrosion testing revealed that the IN671 (Ni-50Cr) alloy was the best material of those tested, whereas FeCrAlY, Hastelloy-X and HS188 exhibited significant increases in corrosion rate between 1050° and 1175° F. The Ni-Cr outer skin compositions, as represented by IN671, consist essentially of 50–80% by weight of nickel and 20–50% by weight of chromium.

The water-cooled nozzle and bucket designs require the use of a highly conductive inner skin in order to reduce peak temperatures and minimize thermal gradients. Table 2 lists some useful subskin materials. The need for a high thermal conductivity restricts the number of choices. Because of its high thermal conductivity, copper is preferred. Silver, equally conductive as copper, has not been considered because of its cost and lower melting point. Because of its poor resistance to water erosion and lack of resistance to environmental degradation (corrosion/erosion) by the hot gas, protection of the copper is an absolute requirement; hence, the need for an outer skin. The outer skin materials to protect the copper from the hot gas have been discussed hereinabove.

Table 1

| | | | OUTER SKIN MATERIALS | | | | | |
|---|---|---|---|---|---|---|---|---|
| Material | Thermal Expansion RT-1000° F. (in/in/° F. × 10$^{-6}$) | Conductivity 1000° F. (BTU/hr ft$^2$ ° F./ft) | Room Temperature[b] Formability | Weldability | Brazeability[e] | Expected Tolerance to Processing | Long Time[f] Stability | Low Cycle Fatigue Resistance |
| Hastelloy-S | 7.3 | 11.6 | Good | Very Good | Good | Good | Excellent[g] | Good[i] |
| INo17 | 7.7 | 12.4 | Good | Good[c] | Good | Good | Good[h] | Good[i] |
| HS188 | 8.2 | 11.5 | Good | Good[c] | Good | Good | Poor[h] | Good[i] |
| Hastelloy-X | 8.2 | 11.3 | Good | Fair–Good | Good | Good | Poor[h] | Good[i] |
| IN671 (Ni-50Cr) | 7.7 | — | Marginal | Acceptable | Acceptable | Good | Good[i] | Fair[i] |
| Nickel 201 | 7.4(200° F.) | 34.2 | Very Good | Good | Good | Good | Good[i] | Poor[i] |
| FeCrAlY (25-4-1) | 6.3(Est) | 15.2(Est) | Marginal | Acceptable | Acceptable | Good | Good[i] | Poor[i] |
| Type 446 | 6.2 | 13.5 | Marginal | Poor | Acceptable | Poor | Very Poor[g] | Good[i] |
| Type 430 | 6.3 | 15.2 | Good | Poor | Acceptable | Poor–Fair | Poor–Fair[g] | Fair[i] |
| Incoley 800 | 9.4 | 11.6 | Good | Good[d] | Good | Poor | Good[g] | Good[i] |
| Incoley 801 | 9.6 | 11.9 | Good | Good[d] | Good | Fair–Good | Good[i] | Good[i] |

Table 1-continued

OUTER SKIN MATERIALS

| Material | Thermal Expansion RI-1000° F. (in/in/° F. × 10⁻⁶) | Conductivity 1000° F. (BTU/hr ft² ° F./ft) | Room Temperature[b] Formability | Weldability | Brazeability[c] | Expected Tolerance to Processing | Long Time[f] Stability | Low Cycle Fatigue Resistance |
| --- | --- | --- | --- | --- | --- | --- | --- | --- |
| Incoley 825 | 8.8 | 10.9 | Good | Good[d] | Good | Good | Good[i] | Good[i] |
| Carpenter 200b-3 | 9.5(Est) | 10.5(752° F.) | Good | Good[d] | Good | Good | Good[i] | Good[i] |

[a] FeCrAlY developmental; all others commercial
[b] Formability assessments based upon forming at room temperature. However, improvements can generally be made by either in-process anneals or forming at elevated temperatures.
[c] Cobalt-based (e.g., HS188) and nickel-based alloys containing high Co(e.g., IN617) may exhibit weld cracking in presence of copper.
[d] Depending upon preweld condition and/or post-weld heat treatment, this alloy may be destabilized during welding thereby leading to possible aqueous corrosion.
[e] Although all alloys considered can be brazed, further effort is essential to identify compatible, ductile, corrosion resistant, and inexpensive braze alloy(s).
[f] Stability refers to a materials resistance to structural changes that results in mechanical property degradation such as toughness (FOD) resistance).
[g] Based upon data in the expected skin operating range (750 to 950° F.).
[h] Based upon the lowest temperature data available (1100 to 1200° F.).
[i] Estimated.
[j] Calculated.

Table 2

SUBSKIN MATERIALS

| Material | Conductivity (BTU/hr ft²° F./ft) | Expansion (in/in/° F. × 10⁻⁶) | Creep Strength 800° F. | Water Erosion Threshold (ft/sec) | Elevated Temperature Corrosion Resistance | Expected Tolerance to Processing Steps |
| --- | --- | --- | --- | --- | --- | --- |
| Copper (OFHC) | 226(68° F.) | 9.8(68°–572° F.) | Poor | 2[a] | Poor | Poor |
| Glidcop A120 | 204(68° F.) | 10.6(100°–600° F.) | Good | 5[a] | Poor | Good |
| Nickel 201 | 42.7(200° F.) | 7.4(200° F.) | Good | 2–5 (Est) | Poor | Good |

[a] Pure soft water at room temperature, approximate values

Pure copper will not provide sufficient strength (creep and yield) at the bucket trailing edges. Strengthening by cold work will not be effective because of rapid annealing during the processing thermal cycles. A commercially available oxide ($Al_2O_3$) dispersion strengthened (ODS) copper (Glidcop) is being considered for application at the trailing edges. Glidcop exhibits greater strength with enhanced elevated temperature stability than OFHC copper while retaining a high conductivity.

Small diameter, thin wall (i.e., 100-mil o.d. x 10- to 20-mil wall) corrosion-resistant tubing is required in the bucket designs to isolate the copper subskin from the cooling water since the copper is subject to corrosion. Ideally, the tubing material should exhibit a relatively high thermal conductivity with an equivalent or greater thermal expansion relative to copper. With respect to the latter, most materials investigated exhibit a slightly lower thermal expansion than copper, but the mismatch is not sufficiently large to cause alarm, either during processing or service. In a preferred system, the tubing is fabricated from A286 alloy which has good corrosion resistance and ideally matches the bucket also cast from the same alloy.

The bucket core material does not need the very high-temperature strength required by conventional gas turbine bucket materials (superalloys), since operation would be in the 300° to 600° F. range vs conventional buckets with airfoils at 1200° to 1800° F. and dovetail/shanks at 600° to 1200° F. Although these temperatures suggest a greatly expanded field of materials, a high thermal expansion requirement relative to the outer/inner skin materials narrows this field. A higher tensile strength material is also required for the bucket spar compared with the nozzle spar. Good low cycle and high cycle fatigue resistance is required. Hot-gas corrosion resistance is not required for bucket core materials where protection is provided by the outer skin. However, direct contact with the environment by the spar may present problems. Therefore, the spar materials should have intrinsic corrosion resistance and provide resistance to water erosion.

For good results in fabrication, the core materials must possess good castability (or forgeability), machinability, weldability, and brazeability. Also, any processing of the composite part must also be compatible with the required core material heat treatment in order to maintain the critical strength properties.

Representative bucket core materials include chromium-nickel-iron alloys as represented by A286 and nickel-base alloys as represented by IN718 and U500, the compositions of which are shown in Table 3. The terminology used and compositions are disclosed by W. F. Simmons, Compilations of Chemical Compositions and Rupture Strengths of Superalloys, ASTM Data Series Publication No. DS9E.

The physical properties of these alloys are shown in Table 4. In view of its thermal expansion characteristics, A286 is preferred compared with IN718. However, the weldability of A286 is poor and in large sizes may have to be forged rather than cast.

It will be appreciated that the invention is not limited to the specific details shown in the examples and illustrations and that various modifications may be made within the ordinary skill in the art without departing from the spirit and scope of the invention.

Table 3

| | NOMINAL COMPOSITIONS, % | | |
| --- | --- | --- | --- |
| | A286 | IN718 | U500 |
| C | 0.05 | 0.04 | 0.08 |
| Mn | 1.40 | 0.18 | 0.75[a] |
| Si | 0.40 | 0.18 | 0.75[a] |
| Cr | 15.0 | 19.0 | 19.0 |
| Ni | 26.0 | 52.5 | Bal |
| Co | — | — | 18.0 |
| Mo | 1.25 | 3.05 | 4.0 |
| Cb | — | 5.13[b] | — |

Table 3-continued

| | NOMINAL COMPOSITIONS, % | | |
|---|---|---|---|
| | A286 | IN718 | U500 |
| Ti | 2.15 | 0.90 | 2.9 |
| Al | 0.20 | 0.50 | 2.9 |
| B | 0.003 | — | 0.005 |
| Fe | Bal | 18.5 | 4.0[a] |
| Other | 0.3V | — | — |

[a]maximum
[b]Ta included

Table 4

| | | | BUCKET SPAR (CORE) MATERIALS | | | | |
|---|---|---|---|---|---|---|---|
| Material[a] | Thermal Expansion[b] RI-700° F. (in/in° F. × 10⁻⁶) | Room Temperature 0.2% YS(ksi) Cast | Forged | Castability Forgeability | Machineability | Brazeability | Weldability | Expected[d] Tolerance to Processing |
| U500 | 7.0 | 115 | 125 | Good/Good | Acceptable | Acceptable | Poor | Poor |
| A286 | 9.6 | 78 | 118 | Poor/Good | Acceptable | Acceptable | Poor | Good |
| IN718 | 8.1 | 123 | 162 | Good/Good | Acceptable | Acceptable | Acceptable | Good |

[a]All commercially available
[b]OFHC Copper: 9.8(RT-672° F.); IN617: 7.5(RT-700° F.)
[c]Wrought Type 304SS: 35 to 45 ksi; above properties reflect fully heat-treated material per specification
[d]Essentially depends on the melting point of copper and the cooling rate from the autoclave processing temperature. Fully heat-treated properties may not be realized.

I claim:

1. A water-cooled gas turbine bucket comprising an airfoil cast from an alloy and having a core with a smooth surface, a thermally conductive layer in heat exchange contact with said surface, a multiplicity of cooling tubes embedded in the thermally conductive layer and each tube being space apart from each adjacent tube, and a protective skin covering the thermally conductive layer to provide protection from hot corrosion for said layer.

2. The turbine bucket of claim 1, wherein
   (a) said airfoil is cast from a member selected from the group consisting of nickel-base alloy, cobalt-base alloy and chromium-nickel-iron alloy,
   (b) said tubing is formed from chromium-nickel-iron alloy,
   (c) said thermally conductive layer is selected from the group consisting of copper and oxide dispersion strengthened copper, and
   (d) said outer skin is a member selected from the group consisting of FeCrAlY and an alloy consisting essentially of 50-80% by weight of nickel and 20-50% by weight of chromium.

3. The turbine bucket of claim 2, wherein the airfoil is cast from chromium-nickel-iron alloy said thermally conductive layer is copper and said outer skin is Ni-50Cr.

UNITED STATES PATENT AND TRADEMARK OFFICE
CERTIFICATE OF CORRECTION

PATENT NO. : 4,156,582
DATED : May 29, 1979
INVENTOR(S) : Rodger O. Anderson

It is certified that error appears in the above-identified patent and that said Letters Patent are hereby corrected as shown below:

In Column 1, Line 27, change "Pat. No." to "Pat. Nos."

In Column 4, Line 8, change "operationg" to "operating"

In Table 1, title of second column, change "RI-1000°F." to "RT-1000°F."

In Table 1, title of third column, place close parenthesis after "°F./ft"

In body of first column of Table 1, change "INo17" to "IN617"

In body of first column of Table 1, change "Incoley 800" to "Incoloy 800"

In body of first column of Table 1, change "Incoley 801" to "Incoloy 801"

In body of first column of Table 1, change "Incoley 825" to "Incoloy 825"

In body of first column of Table 1, change "Carpenter 200b-3" to "Carpenter 20Cb-3"

In Table 2, title of second column, place close parenthesis after "(BTU/hr ft$^2$°F./ft"

In Table 4, title of second column, change "RI-700°F." to "RT-700°F."

In Column 7, Line 31, change "space" to "spaced"

Signed and Sealed this

Eighteenth Day of September 1979

[SEAL]

Attest:

LUTRELLE F. PARKER
Attesting Officer    Acting Commissioner of Patents and Trademarks